US008655550B2

United States Patent
Nakamura et al.

(10) Patent No.: US 8,655,550 B2
(45) Date of Patent: Feb. 18, 2014

(54) ELECTRIC POWER STEERING SYSTEM AND METHOD FOR CONTROLLING THE SAME

(75) Inventors: Yoshifumi Nakamura, Wako (JP); Norio Yamazaki, Wako (JP); Shigenori Takimoto, Wako (JP); Yoshimichi Kawamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 919 days.

(21) Appl. No.: 12/558,574

(22) Filed: Sep. 14, 2009

(65) Prior Publication Data

US 2010/0087988 A1  Apr. 8, 2010

(30) Foreign Application Priority Data

Oct. 3, 2008 (JP) ................................. 2008-258600

(51) Int. Cl.
B62D 5/04 (2006.01)

(52) U.S. Cl.
USPC .............. 701/42; 701/41; 180/443; 180/446

(58) Field of Classification Search
USPC ................ 701/41, 42, 43, 44; 180/443, 446
See application file for complete search history.

(56) References Cited

U.S. PATENT DOCUMENTS

| | | | | |
|---|---|---|---|---|
| 5,508,919 A * | 4/1996 | Suzuki et al. | | 701/41 |
| 6,185,485 B1 * | 2/2001 | Ashrafi et al. | | 701/1 |
| 6,425,454 B1 * | 7/2002 | Chabaan et al. | | 180/443 |
| 6,450,287 B1 * | 9/2002 | Kurishige et al. | | 180/446 |
| 6,729,434 B2 * | 5/2004 | Stevens et al. | | 180/446 |
| 6,729,435 B2 * | 5/2004 | Yamada et al. | | 180/446 |
| 6,789,008 B2 * | 9/2004 | Kato et al. | | 701/41 |
| 7,302,328 B2 * | 11/2007 | Kato et al. | | 701/41 |
| 7,406,373 B2 * | 7/2008 | Kubota et al. | | 701/41 |
| 7,530,423 B2 * | 5/2009 | Limpibunterng et al. | | 180/446 |
| 7,860,624 B2 * | 12/2010 | Kubota et al. | | 701/41 |
| 8,046,131 B2 * | 10/2011 | Tanaka et al. | | 701/41 |
| 2004/0193352 A1 * | 9/2004 | Ito et al. | | 701/70 |
| 2006/0027417 A1 * | 2/2006 | Segawa | | 180/444 |
| 2006/0278466 A1 * | 12/2006 | Cheng | | 180/444 |

(Continued)

FOREIGN PATENT DOCUMENTS

JP  08-263790  10/1996
JP  2001-39325  2/2001

(Continued)

OTHER PUBLICATIONS

Japanese Office Action for corresponding JP Application No. 2008-258600, Jun. 14, 2012.

(Continued)

*Primary Examiner* — Thomas Black
*Assistant Examiner* — Peter D Nolan
(74) *Attorney, Agent, or Firm* — Ditthavong Mori & Steiner, P.C.

(57) ABSTRACT

An electric power steering system includes an electric assist motor, a controller, a first corrector, and a second corrector. The electric assist motor is configured to assist steering according to a steering assist amount. The controller is configured to control the steering assist amount in accordance with an input steering force. The first corrector is configured to correct the steering assist amount with a correction amount in accordance with a steering torque during running on a cant road. The second corrector is configured to correct the correction amount in accordance with a steering angular velocity.

2 Claims, 6 Drawing Sheets

(56) References Cited

U.S. PATENT DOCUMENTS

2007/0233345 A1* 10/2007 Endo et al. ................. 701/41
2007/0265751 A1* 11/2007 Tsuchiya .................... 701/41
2007/0265752 A1* 11/2007 Hayama et al. ............ 701/41

FOREIGN PATENT DOCUMENTS

| JP | 2002-308132 | 10/2002 |
| JP | 2005-324655 | 11/2005 |
| JP | 2006-160007 | 6/2006 |
| JP | 2007-168617 | 7/2007 |

OTHER PUBLICATIONS

Japanese Office Action for corresponding JP Application No. 2008-258600, Oct. 16, 2012.

* cited by examiner

ELECTRIC POWER STEERING SYSTEM AND METHOD FOR CONTROLLING THE SAME

CROSS-REFERENCE TO RELATED APPLICATIONS

The present application claims priority under 35 U.S.C. §119 to Japanese Patent Application No. 2008-258600, filed Oct. 3, 2008. The contents of this application are incorporated herein by reference in their entirety.

BACKGROUND OF THE INVENTION

1. Field of the Invention

The present invention relates to an electric power steering system and a method for controlling the electric power steering system.

2. Discussion of the Background

For safe driving in the rain, road surfaces are sometimes laterally sloped so that rain will not pool thereon. When a vehicle is running on such a laterally sloped road surface (hereinafter referred to as a cant road), it skids to a lower part of the road surface. Hereinafter, this phenomenon will be referred to as a "vehicle skid".

To cause the vehicle to travel straight without skidding to the lower part of the road surface when such a vehicle skid occurs, the driver is forced to perform correction with the steering wheel. This increases the driving load on the driver.

Accordingly, a vehicle-skid preventing device for preventing a vehicle skid while reducing the driving load on the driver has been developed. For example, Japanese Unexamined Patent Application Publication No. 2007-168617 discloses an electric power steering system that corrects the steering assist amount so that the steering assist amount becomes larger when a vehicle skid is detected than when a vehicle skid does not occur.

One known control method for preventing a vehicle skid with the electric power steering system is to correct the steering assist amount in accordance with the steering torque detected by a steering-torque sensor when a vehicle skid occurs.

As the steering torque, however, the steering-torque sensor simultaneously detects both a torque applied to the steering wheel by the driver to prevent a vehicle skid and a torque applied to the steering wheel by the driver to turn the vehicle. Hence, if the steering assist amount is simply corrected in accordance with the steering torque detected by the steering-torque sensor, the amount of correction may become too large or too small.

SUMMARY OF THE INVENTION

According to one aspect of the present invention, an electric power steering system includes an electric assist motor, a controller, a first corrector, and a second corrector. The electric assist motor is configured to assist steering according to a steering assist amount. The controller is configured to control the steering assist amount in accordance with an input steering force. The first corrector is configured to correct the steering assist amount with a correction amount in accordance with a steering torque during running on a cant road. The second corrector is configured to correct the correction amount in accordance with a steering angular velocity.

According to another aspect of the present invention, a method includes assisting steering according to a steering assist amount. The steering assist amount is controlled in accordance with an input steering force. The steering assist amount is corrected with a correction amount in accordance with a steering torque during running on a cant road. The correction amount is corrected in accordance with a steering angular velocity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
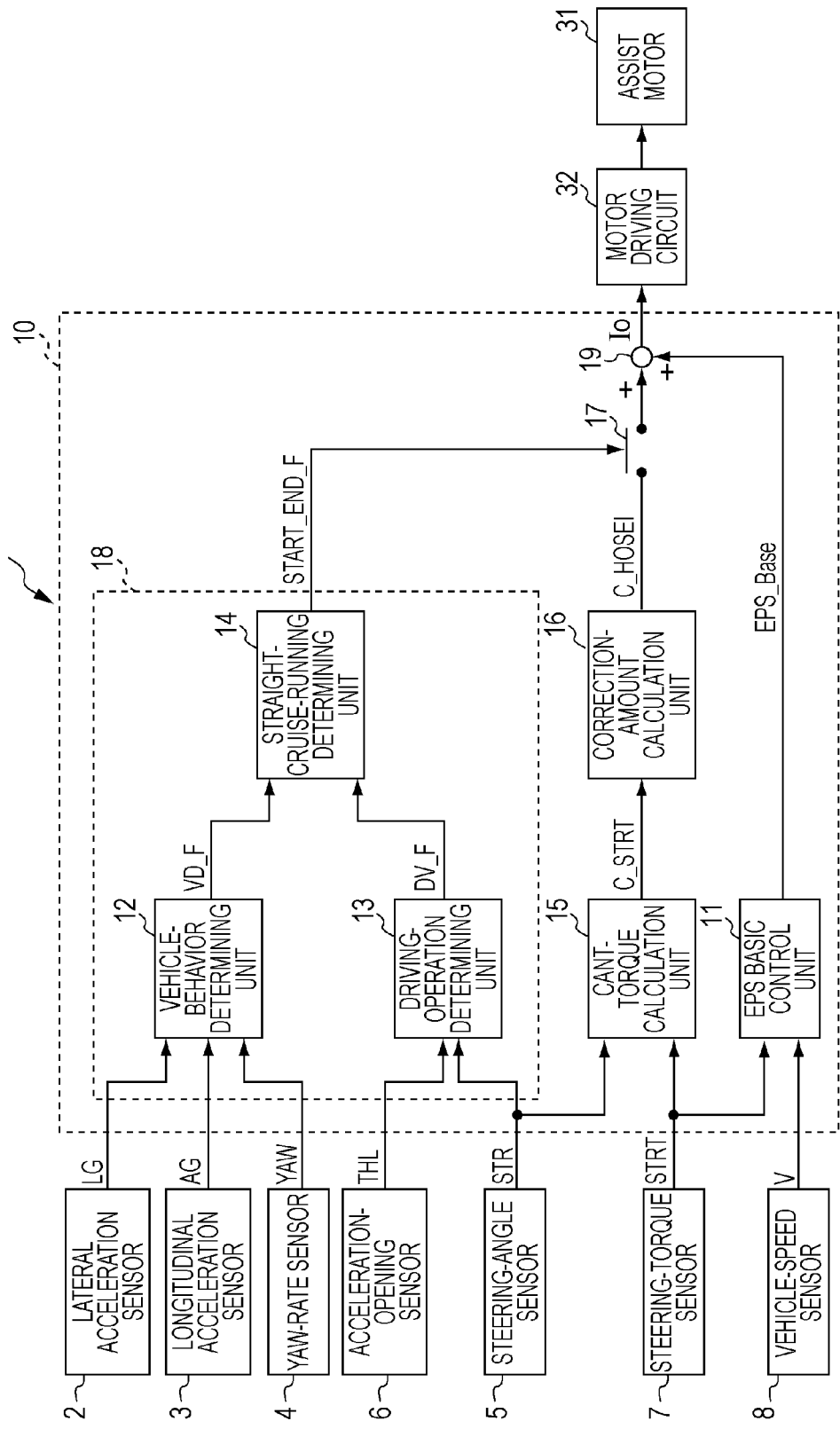
FIG. 1 is a block diagram of an electric power steering system according to an embodiment of the present invention.

Embodiments will now be described with reference to the accompanying drawings, wherein like reference numerals designate corresponding or identical elements throughout the various drawings. An electric power steering system according to an embodiment of the present invention will be described below with reference to FIGS. 1 to 6.

Referring to FIG. 1 serving as a block diagram, an electric power steering system 1 includes a lateral acceleration sensor 2, a longitudinal acceleration sensor 3, a yaw-rate sensor 4, a steering-angle sensor 5, an acceleration-opening sensor 6, a steering-torque sensor 7, a vehicle-speed sensor 8, an electric assist motor 31, a motor driving circuit 32, and an electronic control unit (ECU) 10. The lateral acceleration sensor 2 detects the acceleration in the right-left direction of the vehicle (hereinafter referred to as lateral acceleration). The longitudinal acceleration sensor 3 detects the acceleration in the front-rear direction of the vehicle (hereinafter referred to as longitudinal acceleration). The yaw-rate sensor 4 detects the yaw rate of the vehicle. The steering-angle sensor 5 detects the steering angle of the steering shaft of the vehicle. The acceleration-opening sensor 6 detects the opening of an accelerator of the vehicle. The steering-torque sensor 7 detects the steering torque applied to the steering shaft. The vehicle-speed sensor 8 detects the speed of the vehicle (vehicle speed). The electric assist motor (assist motor) 31 generates a steering assist torque. The motor driving circuit 32 drives the assist motor 31.

The lateral acceleration sensor 2, the longitudinal acceleration sensor 3, the yaw-rate sensor 4, the steering-angle sensor 5, the acceleration-opening sensor 6, the steering-torque sensor 7, and the vehicle-speed sensor 8 respectively output signals LG, AG, YAW, STR, THL, STRT, and V in accordance with detected values to the ECU 10.

In the electric power steering system 1, an assist torque generated by the assist motor 31 is applied to a pinion shaft (not shown) of a steering mechanism, thereby assisting in the steering force of the driver.

The ECU 10 includes an EPS basic control unit 11, a vehicle-behavior determining unit 12, a driving-operation determining unit 13, a straight-cruise-running determining unit 14, a cant-torque calculation unit 15, a correction-amount calculation unit 16, and a skid prevention control on/off switch 17.

The EPS basic control unit 11 calculates an EPS basic control amount (basic control current) EPS_Base of the assist motor 31 on the basis of the vehicle speed V detected by the vehicle-speed sensor 8 and the steering torque STRT detected by the steering-torque sensor 7. Since the EPS basic control amount EPS_Base is calculated by a method similar to that adopted in an electric power steering system of the related art, a detailed description thereof will be omitted. Roughly speaking, the EPS basic control amount EPS_Base is set to increase as the steering torque STRT increases and to decrease as the vehicle speed V increases.

The vehicle-behavior determining unit 12 determines a vehicle behavior on the basis of output signals from the lateral acceleration sensor 2, the longitudinal acceleration sensor 3, and the yaw-rate sensor 4. Specifically, the vehicle-behavior determining unit 12 determines, on the basis of output signals from the lateral acceleration sensor 2 and the yaw-rate sensor 4, whether or not the vehicle is running straight, and determines, on the basis of an output signal from the longitudinal acceleration sensor 3, whether or not the vehicle is cruising.

More specifically, when the absolute value of a lateral acceleration LG detected by the lateral acceleration sensor 2 is less than a predetermined value A (m/s$^2$) and the absolute value of a yaw rate YAW detected by the yaw-rate sensor 4 is less than a predetermined value B (rad/s), the vehicle-behavior determining unit 12 determines that the vehicle is running straight. In contrast, when the absolute value of the lateral acceleration LG is more than or equal to the predetermined value A (m/s$^2$) or when the absolute value of the yaw rate YAW is more than or equal to the predetermined value B (rad/s), the vehicle-behavior determining unit 12 determines that the vehicle is not running straight.

Further, when the absolute value of the longitudinal acceleration AG detected by the longitudinal acceleration sensor 3 is less than a predetermined value C (m/s$^2$), the vehicle-behavior determining unit 12 determines that the vehicle is cruising. In contrast, when the absolute value of the longitudinal acceleration AG is more than or equal to the predetermined value C (m/s$^2$), the vehicle-behavior determining unit 12 determines that the vehicle is not cruising.

It can be said that the degree of activity of the driver in the motion of the vehicle in the front-rear direction is low during cruising, but is high at other times. In other words, the vehicle-behavior determining unit 12 determines the degree of activity of the driver in the motion of the vehicle in the front-rear direction on the basis of the longitudinal acceleration AG detected by the longitudinal acceleration sensor 3.

When the absolute value of the lateral acceleration LG is less than the predetermined value A (m/s$^2$), the absolute value of the yaw rate YAW is less than the predetermined value B (rad/s), and the absolute value of the longitudinal acceleration AG is less than the predetermined value C (m/s$^2$), the vehicle-behavior determining unit 12 determines that the vehicle is cruising straight (normal traveling), and sets a straight cruise running flag VD_F at 1. When the absolute value of the lateral acceleration LG is more than or equal to the predetermined value A (m/s$^2$), when the absolute value of the yaw rate YAW is more than or equal to the predetermined value B (rad/s), or when the absolute value of the longitudinal acceleration AG is more than or equal to the predetermined value C (m/s$^2$), the vehicle-behavior determining unit 12 determines that the vehicle is not cruising straight, and sets the straight cruise running flag VD_F at 0. Then, the vehicle-behavior determining unit 12 outputs a signal of the straight cruise running flag VD_F to the straight-cruise-running determining unit 14.

Figure 3:
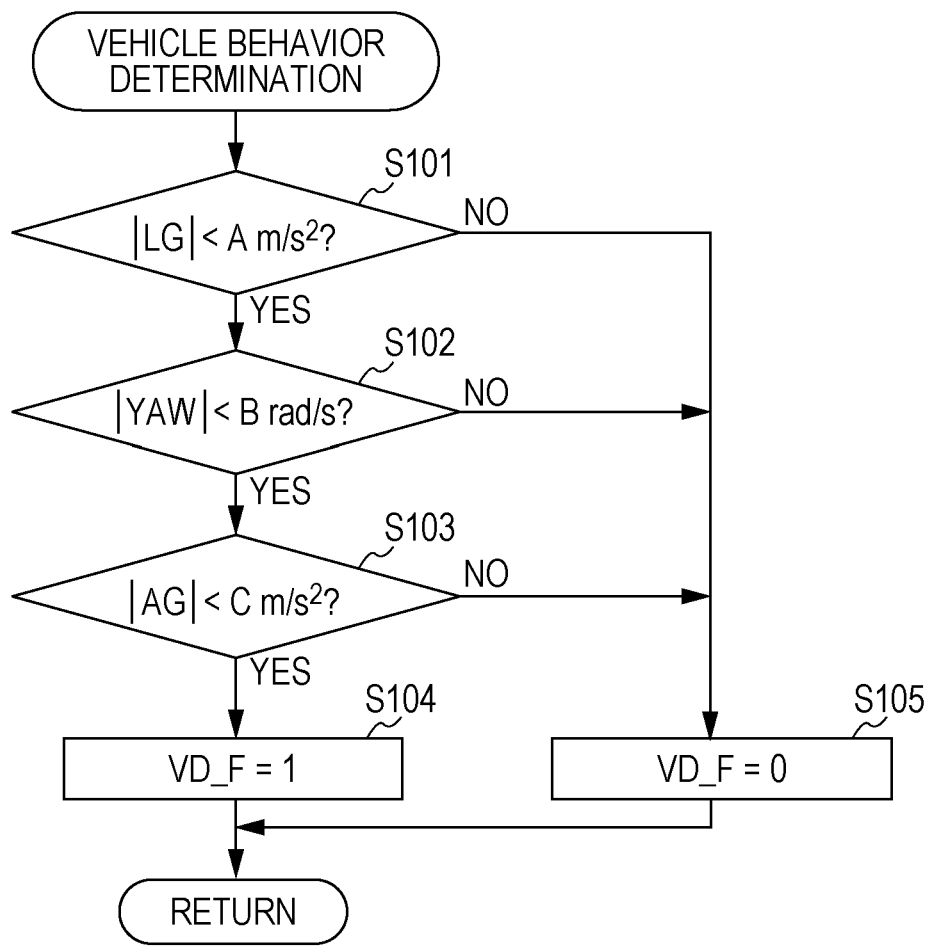
FIG. 3 is a flowchart showing vehicle-behavior determination in the embodiment.

FIG. 3 is a flowchart showing a vehicle-behavior determining routine performed in the vehicle-behavior determining unit 12. The vehicle-behavior determining routine is repeatedly performed by the ECU 10.

First, in Step S101, it is determined whether or not the absolute value of the lateral acceleration LG detected by the lateral acceleration sensor 2 is less than the predetermined value A (m/s$^2$).

When it is determined in Step S101 that the absolute value of the lateral acceleration LG is less than the predetermined value A (|LG|<A), it is then determined in Step S102 whether or not the absolute value of the yaw rate YAW detected by the yaw-rate sensor 4 is less than the predetermined value B (rad/s).

When it is determined in Step S102 that the absolute value of the yaw rate YAW is less than the predetermined value B (|YAW|<B), it is then determined in Step S103 whether or not the absolute value of the longitudinal acceleration AG detected by the longitudinal acceleration sensor 3 is less than the predetermined value C (m/s$^2$).

When it is determined in Step S103 that the absolute value of the longitudinal acceleration AG is less than the predetermined value C (|AG|<C), the straight cruise running flag VD_F is set at 1 in Step S104, and the routine is returned.

When it is determined in Step S101 that the absolute value of the lateral acceleration LG is more than or equal to the predetermined value A (|LG|≥A), when it is determined in Step S102 that the absolute value of the yaw rate YAW is more than or equal to the predetermined value B (|YAW|≥B), and when it is determined in Step S103 that the absolute value of the longitudinal acceleration AG is more than or equal to the predetermined value C (|AG|≥C), the straight cruise running flag VD_F is set at 0 in Step S105, and the routine is returned.

The driving-operation determining unit 13 determines a driving operation on the basis of output signals from the steering-angle sensor 5 and the acceleration-opening sensor 6. Specifically, the driving-operation determining unit 13 determines, on the basis of an output signal from the steering-angle sensor 5, whether or not a straight running operation is being performed, and determines, on the basis of an output signal from the acceleration-opening sensor 6, whether or not a cruising operation is being performed.

More specifically, the driving-operation determining unit 13 determines that a straight running operation is being performed when the absolute value of the steering angle STR detected by the steering-angle sensor 5 is less than a predetermined value D (rad), and determines that a straight running operation is not being performed when the absolute value of the steering angle STR is more than or equal to the predetermined value D (rad).

Further, the driving-operation determining unit 13 determines that a cruising operation is being performed when the acceleration opening THL detected by the acceleration-opening sensor 6 is less than a predetermined value F (rad), and determines that a cruising operation is not being performed when the acceleration opening THL is more than or equal to the predetermined value F (rad).

It can be said that the degree of activity of the driver in the motion of the vehicle in the front-rear direction is low during the cruising operation, but is high at other times. In other words, the driving-operation determining unit 13 determines the degree of activity of the driver in the motion of the vehicle in the front-rear direction on the basis of the acceleration opening THL detected by the acceleration-opening sensor 6.

It is also possible to determine the degree of activity of the driver in the motion of the vehicle in the front-rear direction on the basis of the change in acceleration opening with time, that is, the acceleration opening speed. It can be determined that the degree of activity of the driver is low when the acceleration opening speed is low and is high when the acceleration opening speed is high.

When the absolute value of the steering angle STR is less than the predetermined value D (rad) and the acceleration opening THL is less than the predetermined value F (rad), the driving-operation determining unit 13 determines that a straight cruise operation is being performed, and sets a straight cruise operation flag DV_F at 1. When the absolute value of the steering angle STR is more than or equal to the predetermined value D (rad) or when the acceleration opening THL is more than or equal to the predetermined value F (rad), the driving-operation determining unit 13 determines that a straight cruise operation is not being performed, and sets the straight cruise operation flag DV_F at 0. Then, the driving-operation determining unit 13 outputs a signal of the straight cruise operation flag DV_F to the straight-cruise-running determining unit 14.

Figure 4:
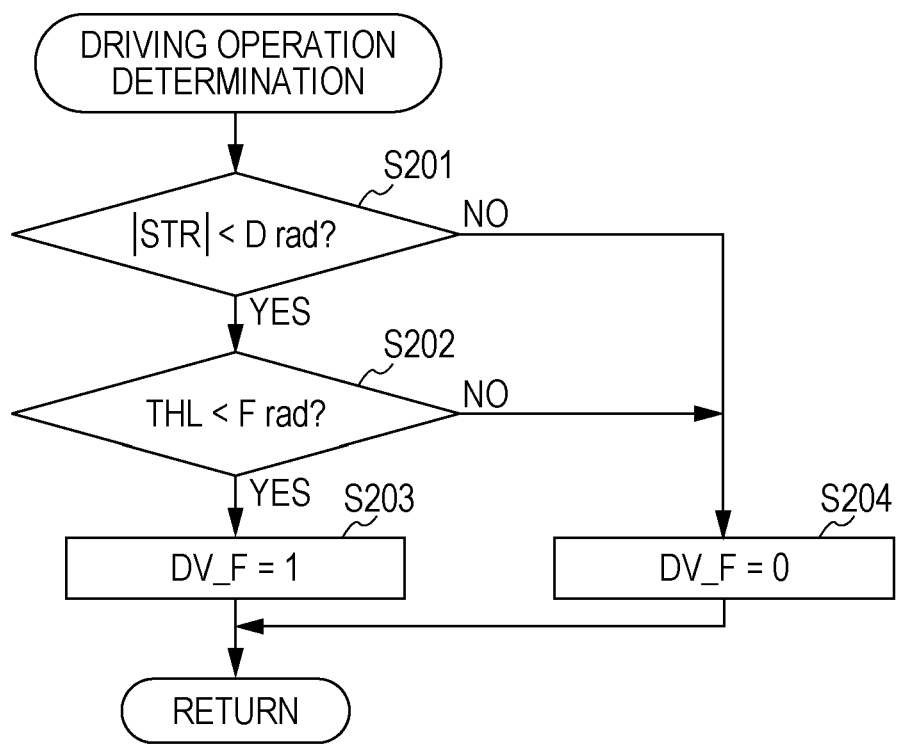
FIG. 4 is a flowchart showing driving-operation determination in the embodiment.

FIG. 4 is a flowchart showing a driving-operation determining routine performed in the driving-operation determining unit 13. The driving-operation determining routine is repeatedly performed by the ECU 10.

First, in Step S201, it is determined whether or not the absolute value of the steering angle STR detected by the steering-angle sensor 5 is less than the predetermined value D (rad).

When it is determined in Step S201 that the absolute value of the steering angle STR is less than the predetermined value D (|STR|<D), it is then determined in Step S202 whether or not the acceleration opening THL detected by the acceleration-opening sensor 6 is less than the predetermined value F (rad).

When it is determined in Step S202 that the acceleration opening THL is less than the predetermined value F (THL<F), the straight cruise operation flag DV_F is set at 1 in Step S203, and the routine is returned.

In contrast, when it is determined in Step S201 that the absolute value of the steering angle STR is more than or equal to the predetermined value D (|STR|≥D) and when it is determined in Step S202 that the acceleration opening THL is more than or equal to the predetermined value F (THL≥F), the straight cruise operation flag DV_F is set at 0 in Step S204, and the routine is returned.

On the basis of the signal of the straight cruise running flag VD_F input from the vehicle-behavior determining unit 12 and the signal of the straight cruise operation flag DV_F input from the driving-operation determining unit 13, the straight-cruise-running determining unit 14 determines whether to turn on (start control) or off (end control) the skid prevention control on/off switch 17.

Specifically, when the straight cruise running flag VD_F is set at 1 and the straight cruise operation flag DV_F is set at 1, the straight-cruise-running determining unit 14 determines that the vehicle is during straight cruising, that the degree of activity of the driver in the motion of the vehicle in the front-rear direction is low, and that the driver wants to carry out vehicle skid prevention control. Then, a control start/end flag START_END_F is set at 1, and the skid prevention control on/off switch 17 is turned on.

In contrast, when the straight cruise running flag VD_F is set at 0, the vehicle is not during straight cruising. When the straight cruise operation flag DV_F is set at 0, the straight cruise operation is not being performed. In any case, therefore, the straight-cruise-running determining unit 14 determines that the degree of activity of the driver in the motion of the vehicle in the front-rear direction is high and that the driver does not want to carry out vehicle skid prevention control. Then, the control start/end flag START_END_F is set at 0, and the skid prevention control on/off switch 17 is turned off.

The vehicle-behavior determining unit 12, the driving-operation determining unit 13, and the straight-cruise-running determining unit 14 constitute a skid prevention control start/end determining unit 18 that determines the start and end of vehicle skid prevention control.

On the basis of output signals from the steering-angle sensor 5 and the steering-torque sensor 7, the cant-torque calculation unit 15 estimates, by calculation, a torque used to keep the vehicle running straight without skidding on the cant road (hereinafter referred to as a cant torque C_STRT), of the steering torque detected by the steering-torque sensor 7. As will be described below, the cant torque C_STRT serves as a basis for calculation of the control amount for preventing vehicle skid (hereinafter referred to as a skid prevention control amount). The skid prevention control amount is set to increase as the cant torque C_STRT increases.

Figure 5:
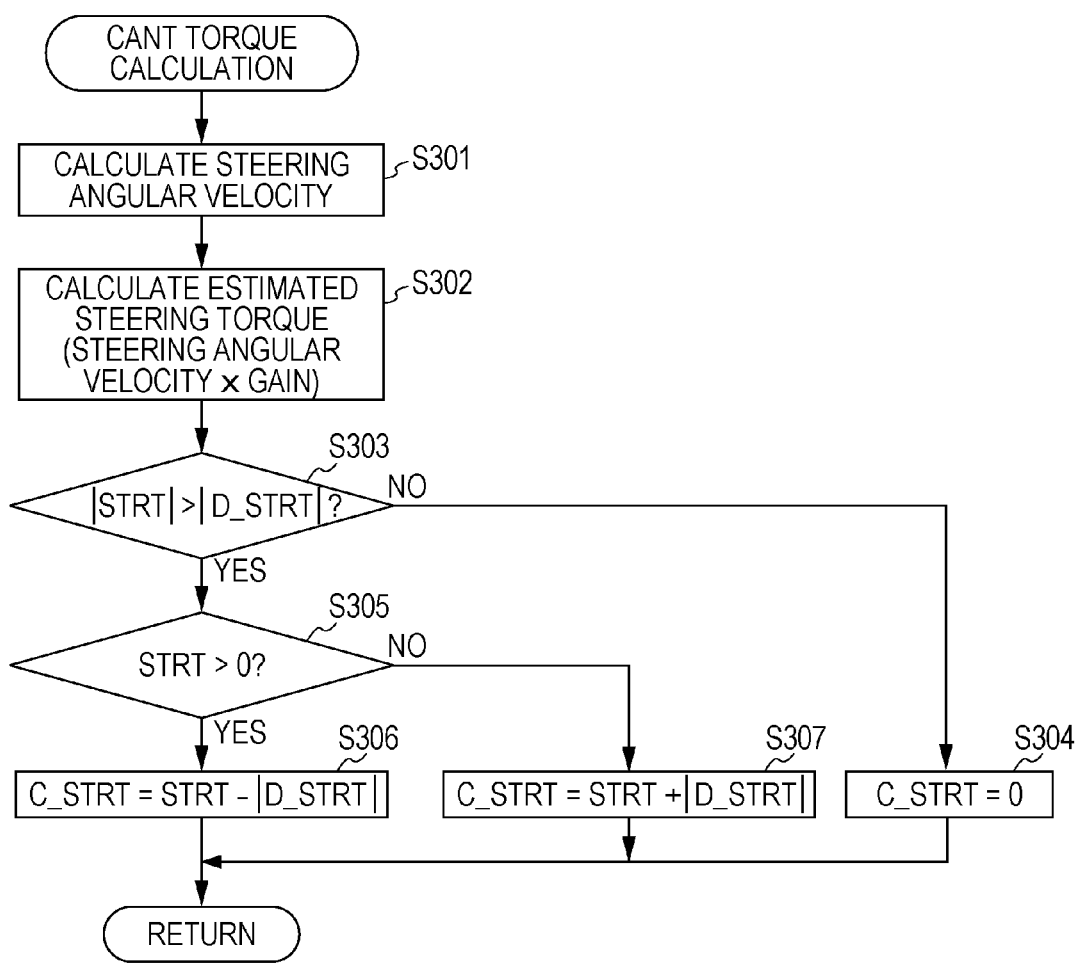
FIG. 5 is a flowchart showing cant-torque calculation in the embodiment.

A calculation method for a cant torque C_STRT will be described with reference to FIG. 5 serving as a flowchart. The flowchart in FIG. 5 shows a cant-torque calculation routine performed in the cant-torque calculation unit 15. The cant-torque calculation routine is repeatedly performed by the ECU 10.

First, in Step S301, a steering angular velocity is calculated by subjecting an output signal from the steering-angle sensor 5 to time differentiation.

In Step S302, the steering angular velocity calculated in Step S301 is multiplied by a predetermined gain, and an obtained product is set as an estimated steering torque D_STRT. Here, the estimated steering torque D_STRT refers to an estimated value of the torque the driver applies to the steering wheel so as to turn the vehicle. When the vehicle is kept running straight on a straight cant road without skidding, the steering angle rarely changes and is kept constant. It can therefore be considered that the steering angle changes when the driver steers the steering wheel to turn the vehicle. Further, it can be estimated that the driver's steering intention to turn the vehicle increases as the steering angular velocity increases.

Accordingly, in the electric power steering system 1, a torque obtained by multiplying the steering angular velocity by a predetermined gain serves as an estimated steering torque D_STRT.

After the estimated steering torque D_STRT is calculated in Step S302, the absolute value of the steering torque STRT detected by the steering-torque sensor 7 and the absolute value of the estimated steering torque D_STRT calculated in Step S302 are compared in Step S303, and it is determined whether or not the absolute value of the steering torque STRT is larger than the absolute value of the estimated steering torque D_STRT.

When it is determined in Step S303 that the absolute value of the steering torque STRT detected by the steering-torque sensor 7 is less than or equal to the absolute value of the estimated steering torque D_STRT calculated in Step S302 (|STRT|≤|D_STRT|), a cant torque C_STRT is set at 0 in Step S304 (C_STRT=0). That is, in this case, the driver's steering intention to turn the vehicle is extremely strong, and if skid prevention control is performed in this case, the driver feels discomfort in steering. Hence, the cant torque C_STRT is set at 0 so that skid prevention control is not substantially performed.

When it is determined in Step S303 that the absolute value of the steering torque STRT detected by the steering-torque sensor 7 is larger than the absolute value of the estimated steering torque D_STRT calculated in Step S302 (|STRT|>|D_STRT|), it is determined in Step S305 whether or not the detected steering torque STRT has a positive value (torque in a clockwise turning direction).

When it is determined in Step S305 that the steering torque STRT has a positive value (STRT>0), in Step S306, the absolute value of the estimated steering torque D_STRT calculated in Step S302 is subtracted from the steering torque STRT detected by the steering torque sensor 7, and an obtained difference is set as a cant torque C_STRT (C_STRT=STRT−|D_STRT|).

In contrast, when it is determined in Step S305 that the steering torque STRT is less than or equal to 0 (STRT≤0), since the steering torque STRT is a torque in a counterclockwise turning direction, it is added in Step S307 to the absolute value of the estimated steering torque D_STRT calculated in Step S302. An obtained sum is set as a cant torque C_STRT (C_STRT=STRT+|D_STRT|).

Figure 6:
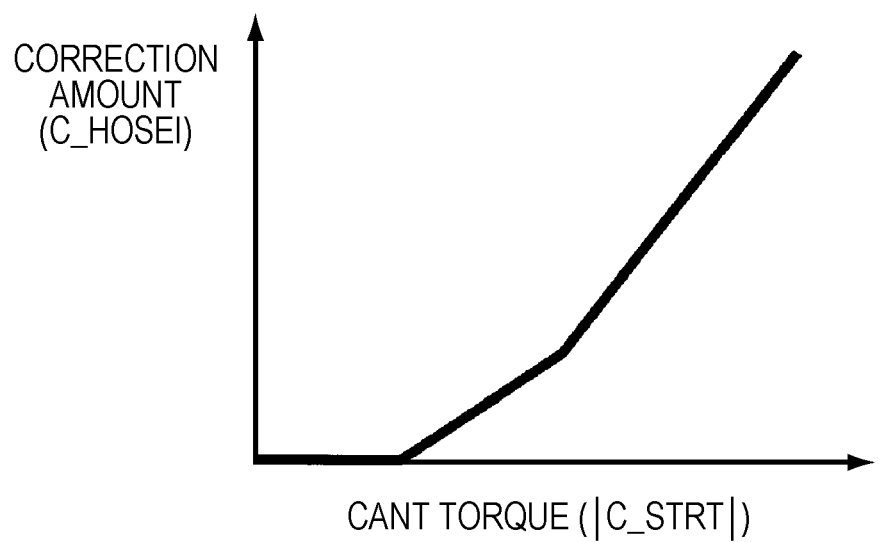
FIG. 6 is an example of a correction amount (vehicle-skid prevention control amount) table used in the embodiment.

The correction-amount calculation unit 16 calculates a correction amount (correction current) C_HOSEI on the basis of the cant torque C_STRT output from the cant-torque calculation unit 15, for example, with reference to a correction amount table shown in FIG. 6. This correction amount C_HOSEI serves as a skid prevention control amount.

The cant-torque calculation unit 15 and the correction-amount calculation unit 16 can be regarded as a correction unit that corrects the correction amount C_HOSEI for the EPS basic correction amount C_Base in accordance with the steering angular velocity STR.

In the correction amount table shown in FIG. 6, the horizontal axis indicates the absolute value of the cant torque C_STRT, and the vertical axis indicates the correction amount C_HOSEI. The correction amount C_HOSEI is set to remain 0 until the absolute value of the cant torque C_STRT reaches a predetermined value, and to gradually increase as the absolute value of the cant torque C_STRT increases above the predetermined value. In other words, the correction amount C_HOSEI for skid prevention control is set to increase as the absolute value of the cant torque C_STRT increases.

As described above, the cant torque C_STRT is basically calculated as a torque that is obtained by subtracting the estimated steering torque D_STRT from the steering torque STRT detected by the steering-torque sensor 7 and that is used to keep the vehicle running straight without skidding on a cant road. Hence, the correction amount C_HOSEI for skid prevention control can be set at an adequate value.

Since the estimated steering torque D_STRT increases as the steering angular velocity increases and the absolute value of the cant torque C_STRT decreases as the estimated steering torque D_STRT increases, the correction amount C_HOSEI is set to become a smaller value as the steering angular velocity increases.

Further, as described above, when the absolute value of the steering torque STRT detected by the steering-torque sensor 7 is less than or equal to the absolute value of the estimated steering torque D_STRT, it is estimated that the driver's steering intention to turn the vehicle is extremely strong, and the cant torque C_STRT is set at 0 so that skid prevention control is not substantially performed. Thus, the driver does not feel discomfort in steering.

When the skid prevention control on/off switch 17 is ON, an adder 19 calculates a target current $I_0$ ($I_0$=EPS_Base+ C_HOSEI) of the assist motor 31 by adding the EPS basic control amount EPS_Base of the EPS basic control unit 11 and the correction amount C_HOSEI, and outputs the target current $I_0$ to the motor driving circuit 32.

The motor driving circuit 32 performs feedback control so that an actual current of the assist motor 31 coincides with the target current $I_0$.

When the skid prevention control on/off switch 17 is OFF, the correction amount C_HOSEI is not input to the adder 19, but only the EPS basic control amount EPS_Base of the EPS basic control unit 11 is input thereto and is output to the motor driving circuit 32. In short, the correction amount C_HOSEI is 0 in this case.

Assist motor control in the electric power steering system 1 of this embodiment will now be described with reference to FIG. 2 serving as a flowchart.

Figure 2:
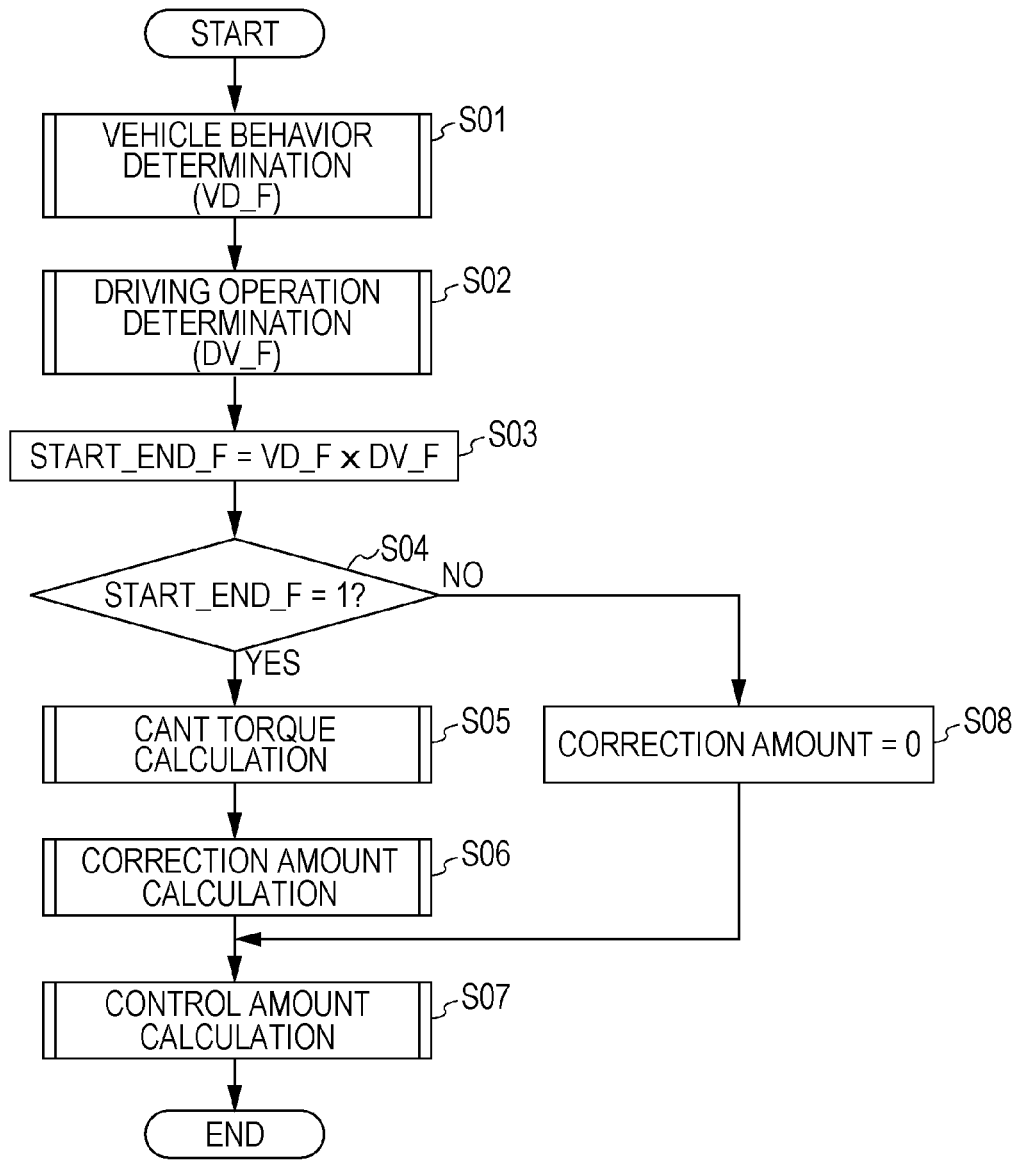
FIG. 2 is a flowchart showing control of an assist motor in the electric power steering system of the embodiment.

A skid prevention control routine shown in the flowchart of FIG. 2 is repeatedly performed at regular intervals by the ECU 10.

First, in Step S01, the above-described vehicle-behavior determination is carried out on the basis of output signals from the lateral acceleration sensor 2, the longitudinal acceleration sensor 3, and the yaw-rate sensor 4, and the straight cruise running flag VD_F is set at 1 or 0.

Next, in Step S02, the above-described driving operation determination is carried out on the basis of output signals from the steering-angle sensor 5 and the acceleration-opening sensor 6, and the straight cruise operation flag DV_F is set at 1 or 0.

Then, in Step S03, the straight cruise running flag VD_F and the straight cruise operation flag DV_F are multiplied to obtain the product as a control start/end flag START_END_F (START_END_F=VD_F×DV_F).

In Step S04, it is determined whether or not the control start/end flag START_END_F is 1.

When it is determined in Step S04 that the control start/end flag START_END_F is 1 (START_END_F=1), a cant torque C_STRT is calculated in Step S05 on the basis of the output signals from the steering-torque sensor 7 and the steering-angle sensor 5.

Then, in Step S06, a correction amount C_HOSEI is calculated from the cant torque C_STRT.

Next, in Step S07, a control amount (target current) 10 for the assist motor 31 is calculated by adding the correction amount C_HOSEI to the EPS basic control amount C_Base of the EPS basic control unit 11 ($I_0$=EPS_Base+C_HOSEI).

In contrast, when it is determined in Step S04 that the control start/end flag START_END_F is not 1 (START_END_F=0), a correction amount C_HOSEI is set at 0 in Step S08, and the routine proceeds to Step S07. In this case, the control amount (target current) $I_0$ for the assist motor 31 coincides with the EPS basic control amount EPS_Base ($I_0$=EPS_Base).

As described above, according to the electric power steering system 1 of this embodiment, the correction amount C_HOSEI for the EPS basic control amount C_Base is corrected in accordance with the steering angular velocity. This allows the correction amount C_HOSEI to be set at an appropriate value. As a result, it is possible to adequately prevent a vehicle skid.

In an embodiment of the present invention, an electric power steering system (e.g., an electric power steering system 1 in a below-described embodiment) controls a steering assist amount of an electric assist motor (e.g., an assist motor 31 in the below-described embodiment) in accordance with an input steering force (e.g., a steering torque in the below-described embodiment), and corrects the steering assist amount in accordance with a steering torque provided during running on a cant road. The electric power steering system corrects a correction amount for the steering assist amount in accordance with a steering angular velocity.

Since the driver's steering intention to turn the vehicle can be estimated from the steering angular velocity, the correction amount for the steering assist amount can be properly set by being corrected in accordance with the steering angular velocity.

The electric power steering system may decrease the correction amount for the steering assist amount as an absolute value of the steering angular velocity increases.

Since it can be estimated that the driver's steering intention to turn the vehicle increases as the absolute value of the steering angular velocity increases, the correction amount for the steering assist amount can be properly set by being decreased as the absolute value of the steering angular velocity increases.

By virtue of the above, the correction amount for the steering assist amount can be properly set, and therefore, a vehicle skid can be prevented adequately.

For example, the configuration of the skid prevention control start/end determining unit 18 is not limited to that adopted in the above-described embodiment.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An electric power steering system comprising:
   an electric assist motor configured to assist steering according to a steering assist amount;
   a controller configured to control the steering assist amount in accordance with an input steering force;
   a first corrector configured to correct the steering assist amount with a correction amount in accordance with a steering torque during running on a cant road;
   a second corrector configured to correct the correction amount in accordance with a steering angular velocity; and
   a steering torque sensor configured to provide a detected steering torque,
   wherein the controller is configured to calculate an estimated steering torque based on the steering angular velocity, and the second corrector is configured to change the correction amount in accordance with a comparison between the detected steering torque and the estimated steering torque.

2. The electric power steering system according to claim 1, wherein the second corrector sets the correction amount substantially to zero if an absolute value of the estimated steering torque is larger than an absolute value of the detected steering torque.

* * * * *